(12) United States Patent
Cheng et al.

(10) Patent No.: US 8,641,261 B2
(45) Date of Patent: Feb. 4, 2014

(54) BACKLIGHT MODULE

(75) Inventors: Ching-Hung Cheng, Hsin-Chu (TW); Ta-Jen Huang, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 0 days.

(21) Appl. No.: 13/400,778

(22) Filed: Feb. 21, 2012

(65) Prior Publication Data

US 2012/0300428 A1 Nov. 29, 2012

(30) Foreign Application Priority Data

May 24, 2011 (TW) .............................. 100118097 A

(51) Int. Cl.
*F21V 7/04* (2006.01)
*G02F 1/1333* (2006.01)

(52) U.S. Cl.
USPC ............. 362/633; 362/632; 362/606; 349/58

(58) Field of Classification Search
USPC .................. 362/26, 27, 600–634, 97.1–97.4; 349/61, 64, 65
See application file for complete search history.

(56) References Cited

U.S. PATENT DOCUMENTS

| | | | | |
|---|---|---|---|---|
| 5,788,356 | A * | 8/1998 | Watai et al. | 362/621 |
| 6,435,686 | B1 * | 8/2002 | Gotou et al. | 362/623 |
| 6,733,147 | B2 * | 5/2004 | Wang et al. | 362/26 |
| 6,853,410 | B2 * | 2/2005 | Matsuda et al. | 349/67 |
| 6,979,113 | B2 * | 12/2005 | Nakano | 362/633 |
| 7,528,901 | B2 | 5/2009 | Hashimoto et al. | |
| 8,199,280 | B2 | 6/2012 | Kim et al. | |
| 2008/0285309 | A1 * | 11/2008 | Fang et al. | 362/620 |
| 2010/0188607 | A1 * | 7/2010 | Park et al. | 349/62 |

FOREIGN PATENT DOCUMENTS

| | | |
|---|---|---|
| CN | 101082406 A | 12/2007 |
| CN | 101592298 A | 12/2009 |
| JP | 2006154320 | 6/2006 |
| JP | 2006156324 | 6/2006 |
| JP | 2007279593 | 10/2007 |
| TW | M280491 | 11/2005 |
| TW | 200632445 | 9/2006 |
| TW | 200817460 | 4/2008 |

OTHER PUBLICATIONS

China Office Action dated Sep. 26, 2012.
English translation of abstract of TW M280491.
English translation of abstract of TW 200632445.
English translation of abstract of TW 200817460.
English translation of abstract of JP 2007279593.
English translation of abstract of JP 2006156324.
English translation of abstract of JP 2006154320.

* cited by examiner

*Primary Examiner* — Jong-Suk (James) Lee
*Assistant Examiner* — Alexander Garlen
(74) *Attorney, Agent, or Firm* — McClure, Qualey & Rodack, LLP

(57) ABSTRACT

A backlight module is disclosed. The backlight module includes a light guide plate, a backlight source, an optical plate, and an optical coating layer. The light guide plate has a light emitting surface and a light incident end. The light incident end is located at an adjacent side of the light emitting surface. The backlight source is disposed corresponding to the light incident end and generates lights emitting to the light incident end. The optical plate is disposed above the light emitting surface. The optical plate includes an extension portion extending disposed above the backlight source. The optical coating layer is formed on a surface of the extension portion.

14 Claims, 7 Drawing Sheets

BACKLIGHT MODULE

BACKGROUND

1. Technical Field

The disclosure relates to a liquid crystal display (LCD), in particular, to a backlight module applied in the liquid crystal display to improve the light leakage phenomenon of the backlight module.

2. Description of the Prior Art

In recent years, with the continuous progress of display technology, the liquid crystal display is mass produced and widely used. It is no doubt that the liquid crystal display has become the mainstream of the flat panel display technology.

In general, the backlight module is a very important part of the liquid crystal display, and the light guide plate (LGP) is an indispensable unit of the backlight module. Once the light guide plate is deformed and warped, the brightness of the display will become uneven and the Mura phenomenon is generated, such as the traces in a ripple form or a stripe form. In view of this, as shown in FIG. 1, in an edge-type LED backlight module 1 used in current liquid crystal display, a frame 12 of a light incident side is designed to be all-inclusive to fix a light guide plate 10, so that the light guide plate 10 will not be deformed and warped to improve the above-mentioned shortcoming of the conventional display.

However, the shortcoming of this design is that the ear structure 140 of the screw locking the circuit board 14 causes holes existed on the frame 12. In order to prevent the light of the LED backlight source 16 from emitting out of the backlight module 1 from the holes, a reflecting film R should be additionally adhered between the LED backlight source 16 and the LED holder 18. It will cause the increasing of the production cost of the backlight module 1 and the assembly of the backlight module 1 will also become harder.

SUMMARY

Therefore, a scope of the disclosure is to provide a backlight module applied in a liquid crystal display to solve the above-mentioned problems.

In an embodiment, the backlight module includes a light guide plate, a backlight source, an optical plate, and an optical coating layer. The light guide plate has a light emitting surface and a light incident end. The light incident end is located at an adjacent side of the light emitting surface. The backlight source is disposed corresponding to the light incident end and generates lights emitting to the light incident end. The optical plate is disposed above the light emitting surface. The optical plate includes an extension portion extending disposed above the backlight source. The optical coating layer is formed on a surface of the extension portion.

In an embodiment, the optical plate is a diffusion film, a prism film, or a polarizer.

In an embodiment, the optical coating layer formed by a light reflecting material or a light absorbing material.

In an embodiment, the light reflecting material is one selected from a group formed by barium sulfate, titanium dioxide, silica, polyethyleneterephthalate (PET), white ink, white resin, and metal.

In an embodiment, the light absorbing material is one selected from a group formed by grey resin, black resin, grey ink, and black ink.

In an embodiment, the optical coating layer is formed on the surface of the extension portion through a coating way, a depositing way, or an electroplating way.

In an embodiment, the surface is a top surface or a bottom surface of the extension portion.

In an embodiment, the optical coating layer is formed in a light incident region on the surface of the extension portion, a boundary of the light incident region is an edge of an active area, and another boundary of the light incident region at most extends to be aligned with a side of the backlight source. The active area is a visible area of a display panel disposed above the backlight module.

In an embodiment, the backlight module further includes a frame. The frame is disposed near a bottom and a side of the backlight source. The frame has an open corresponding to the side of the backlight source, and the extension portion extends to an edge of the open.

In an embodiment, the length of the optical plate in the horizontal direction is longer than the length of the light guide plate in the horizontal direction.

In an embodiment, the area of the optical plate is larger than the area of the light guide plate.

In an embodiment, the backlight module further includes another optical plate which is also disposed above the light emitting surface. The another optical plate includes another extension portion extending disposed above the backlight source.

In an embodiment, the another optical plate is disposed above the optical plate or under the optical plate.

In an embodiment, the backlight module includes a light guide plate, a backlight source, an optical plate, and an optical coating layer. The light guide plate has a light emitting surface and a light incident end. The light incident end is located at an adjacent side of the light emitting surface. The backlight source is disposed corresponding to the light incident end and generates lights emitting to the light incident end. The optical plate is disposed above the light emitting surface. The optical plate includes an extension portion extending to the light incident end of the light guide plate. The optical coating layer is formed on a surface of the extension portion.

In an embodiment, the backlight module includes a light guide plate, a backlight source, an optical plate, and an optical coating layer. The light guide plate has a light emitting surface and a light incident end. The light incident end is located at an adjacent side of the light emitting surface. The backlight source is disposed corresponding to the light incident end and generates lights emitting to the light incident end. The optical plate is disposed above the light emitting surface. The optical plate includes an extension portion. The optical coating layer is formed on a surface of the extension portion. The extension portion of the optical plate is overlapped by the vertical projection area of the backlight source and a part of the light guide plate.

Compared to the prior art, the backlight module applied in the liquid crystal display of the invention has a design of the original optical plate extending toward the LED backlight source, so that the backlight module of the invention can effectively prevent the light of the LED backlight source from emitting out of the backlight module from the holes on the metal member of frame without a reflecting film additionally disposed between the LED backlight source and the LED holder, not only the production cost of the backlight module can be lowered, but also the assembly process of the backlight module can be simplified.

The advantage and spirit of the invention may be understood by the following detailed descriptions together with the appended drawings.

BRIEF DESCRIPTION OF THE APPENDED DRAWINGS

FIG. 3, FIG. 5, FIG. 6, and FIG. 7 illustrate cross-sectional views of different embodiments of the optical plate set in the backlight module respectively.

FIG. 4A through FIG. 4F illustrate top views of different embodiments of the optical coating layer formed on the bottom surface of the extension portion respectively.

Figure 8A:
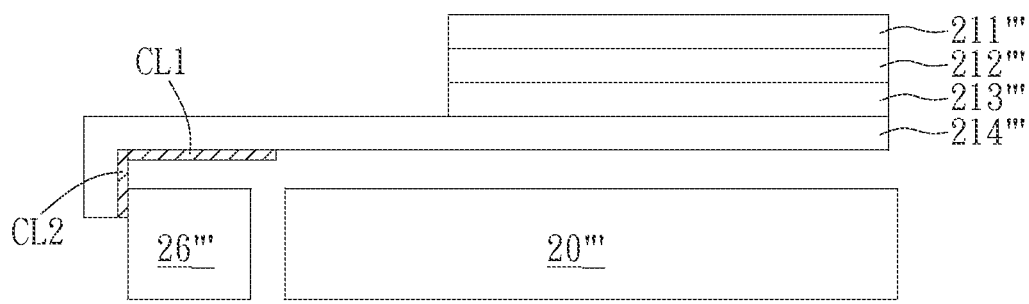
Figure 8B:
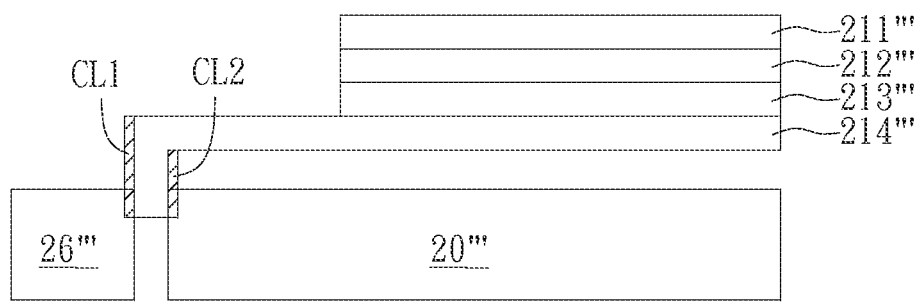

FIG. 8A and FIG. 8B illustrate cross-sectional views of different embodiments of the optical coating layer coated on the optical plate respectively.

DETAILED DESCRIPTION

A preferred embodiment of the invention is a backlight module. In this embodiment, the backlight module is an edge-type LED backlight module, and the backlight module can prevent the light of the LED backlight source from emitting out of the backlight module from the holes on the metal member without a reflecting film additionally disposed between the LED backlight source and the LED holder. Next, the backlight module of the invention will be introduced in detail as follows.

Figure 1:
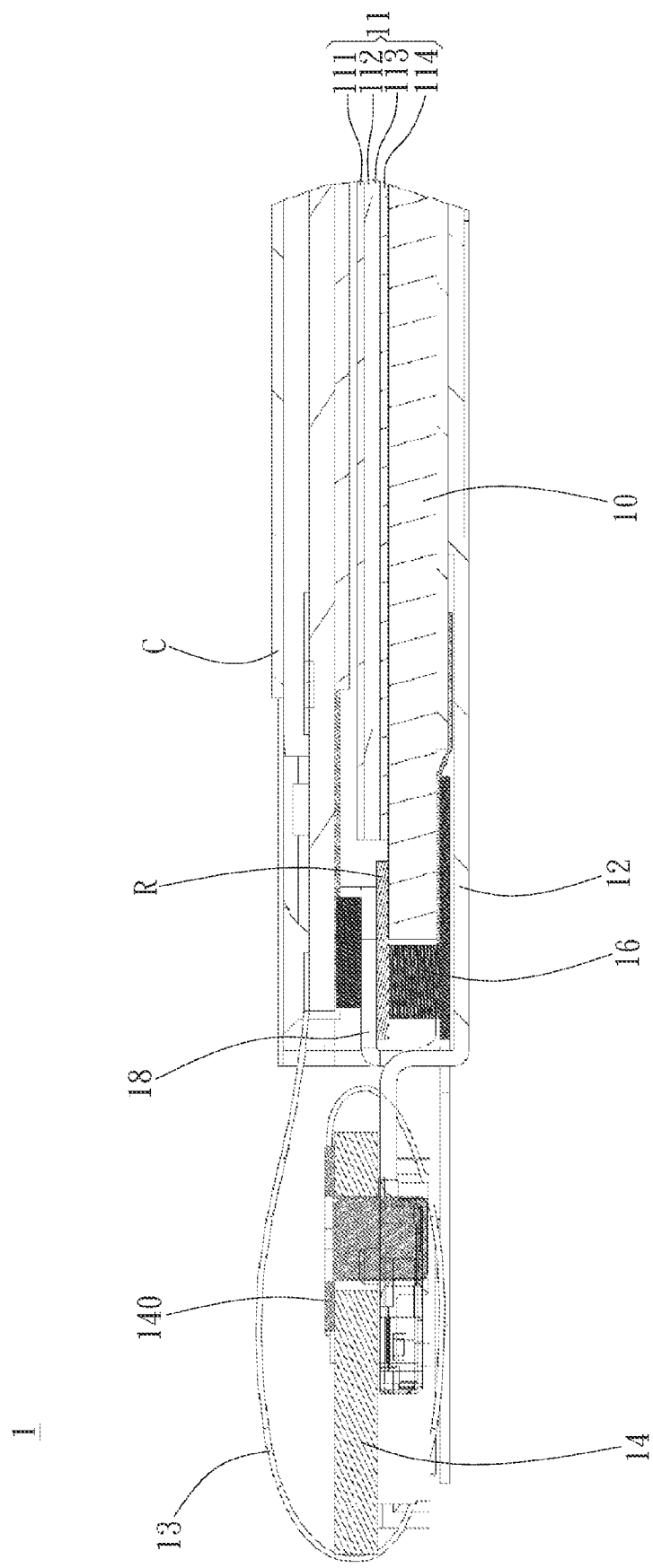
FIG. 1 illustrates a cross-sectional view of a backlight module in a prior art.
Figure 2:
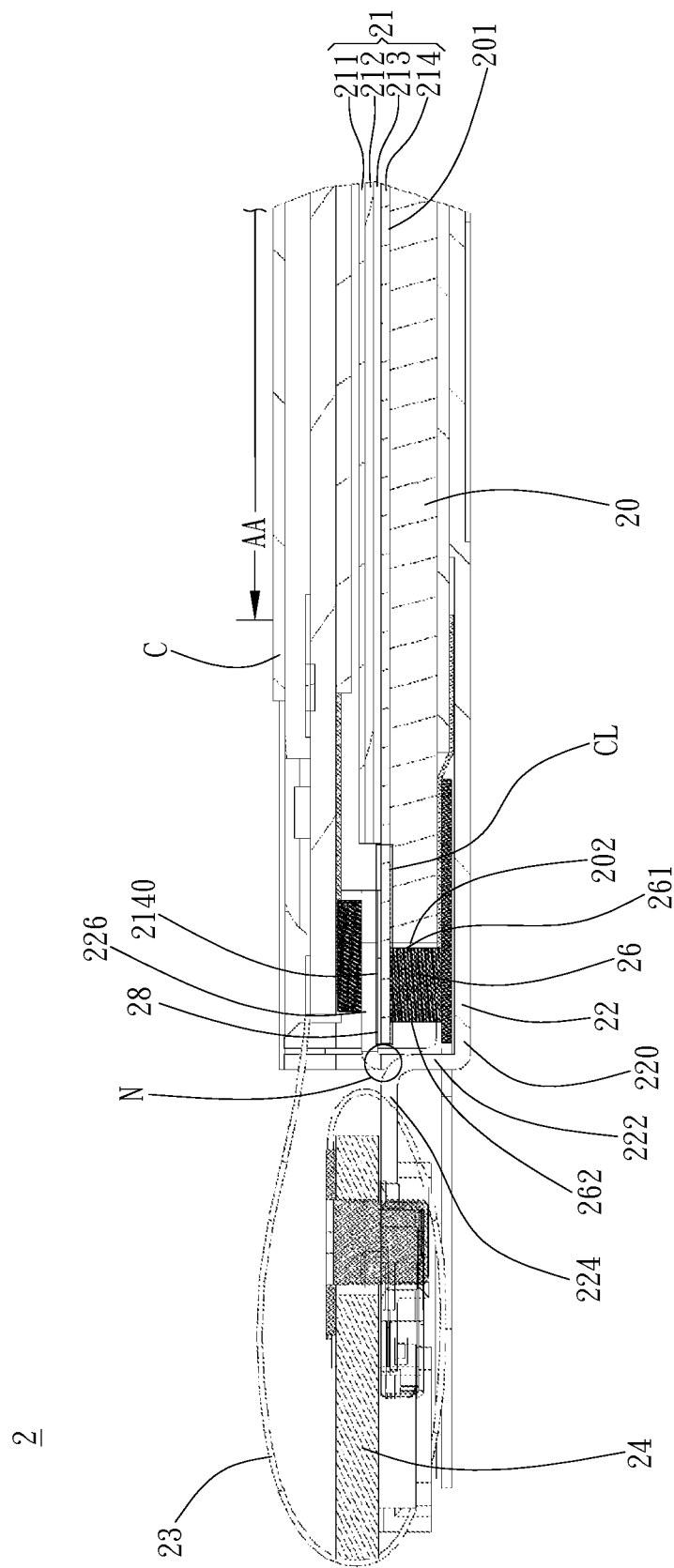
FIG. 2 illustrates a cross-sectional view of a backlight module in a preferred embodiment of the invention.

Please refer to FIG. 2. FIG. 2 illustrates a cross-sectional view of a backlight module in the embodiment of the invention. As shown in FIG. 2, the backlight module 2 includes a light guide plate 20, an optical plate set 21, a frame 22, a flexible circuit board 23, a circuit board 24, a LED backlight source 26, and a LED holder 28. Wherein, the light guide plate 20 and the LED backlight source 26 are disposed above the frame 22. The light guide plate 20 has a light emitting surface 201 and a light incident end 202, and the light incident end 202 is located at an adjacent side of the light emitting surface 201. A first side 261 of the LED backlight source 26 is disposed corresponding to the light incident end 202 of the light guide plate 20, and generates lights emitting to the light incident end 202 and enters into the light guide plate 20. The optical plate set 21 is disposed above the light emitting surface 201 of the light guide plate 20. The frame 22 is disposed near the bottom and the second side 262 of the LED backlight source 26. The frame 22 has a bottom surface 220, a sidewall 222, a folding portion 224, and a catching portion 226. The bottom surface 220 and the sidewall 222 are connected. The folding portion 224 and the catching portion 226 are connected to the sidewall 222 respectively. The folding portion 224 and the bottom surface 220 have no overlapping region in vertical projection direction, and the catching portion 226 and the bottom surface 220 have an overlapping region in vertical projection direction. The catching portion 226 can be extended above the light guide plate 20. The frame 22 and the LED holder 28 are one-piece, and the LED holder 28 has an open N corresponding to the second side 262 of the LED backlight source 26. The open N is formed between the folding portion 224 and the sidewall 222 and an optical coating layer CL is disposed corresponding to the open N. In this embodiment, the frame 22 is used to contain the LED backlight source 26 and the light guide plate 20. A display panel C is disposed on the backlight module 2, and the display panel C has an active area. In this embodiment, the active area means the visible area of the display panel C, but not limited to this case. For example, the display panel C can be a touch display, and the active area can be a touch sensible area.

Figure 3:
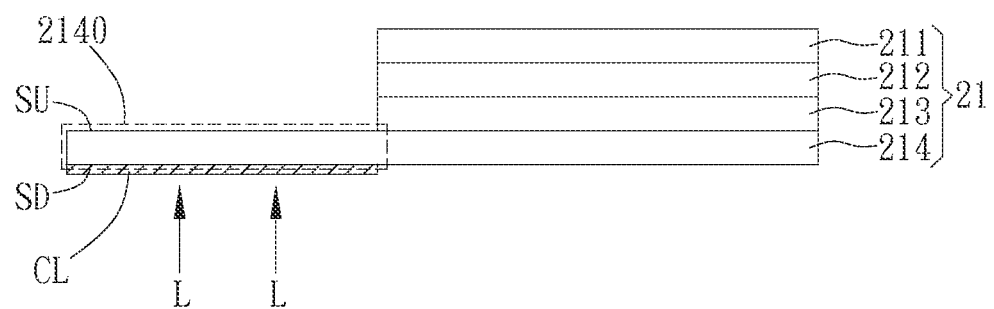

For the sake of clarity, the detailed structure of the optical plate set 21 in this embodiment is illustrated in FIG. 3. As shown in FIG. 3, the optical plate set 21 totally includes four optical plates 211~214, and the optical plates 211~214 are a top diffusion film 211, a top prism film 212, a bottom prism film 213, a bottom diffusion film 214 from top to down. That is to say, the bottom diffusion film 214 is closest to the light emitting surface 201 of the light guide plate 20, and the top diffusion film 211 is farthest from the light emitting surface 201 of the light guide plate 20. In fact, the number, types, and thicknesses of the optical plates of the optical plate set 21 can be determined based on practical needs, and not limited to the diffusion films and the prism films in this embodiment.

In this embodiment, the top diffusion film 211, the top prism film 212, and the bottom prism film 213 of the optical plate set 21 are the same with the conventional optical plate set, but the bottom diffusion film 214 closest to the light emitting surface 201 of the light guide plate 20 includes an extension portion 2140 extending disposed above the LED backlight source 26, but the extension portion 2140 will not be disposed under the display panel C and the active area. That is to say, the length of the bottom diffusion film 214 in the horizontal direction is longer than the lengths of the top diffusion film 211, the top prism film 212, and the bottom prism film 213 in the horizontal direction, and the length of the bottom diffusion film 214 in the horizontal direction is longer than the length of the light guide plate 20 in the horizontal direction. The area of the bottom diffusion film 214 is larger than the area of the light guide plate 20. An extension portion 2140 of the bottom diffusion film 214 extends over the light incident end 202 of the light guide plate 20 and through the space between the LED backlight source 26 and the LED holder 28, and it extends until the edge of the open N of the LED holder 28. The extension portion 2140 of the bottom diffusion film 214 is overlapped by the upward vertical projection area of the LED backlight source 26 and a part of the light guide plate 20.

As shown in FIG. 2 and FIG. 3, a bottom surface SD of the extension portion 2140 of the bottom diffusion film 214 is adjacent to and face the LED backlight source 26 and the light emitting surface 201 of the light guide plate 20. It should be noticed that the bottom diffusion film 214 is not disposed to reflect or absorb lights. Therefore, as shown in FIG. 3, in this embodiment, an optical coating layer CL is formed on the bottom surface SD of the extension portion 2140 of the bottom diffusion film 214, so that the extension portion 2140 of the bottom diffusion film 214 can prevent the lights from emitting from the holes. The optical coating layer CL is extended from one end of the bottom surface SD of the extension portion 2140 toward another end of the bottom surface SD of the extension portion 2140, and the optical coating layer CL can be extended to a space above a part of the light guide plate 20, but not limited to this.

In this embodiment, the optical coating layer CL is formed in a light incident region on the bottom surface SD of the extension portion 2140. In fact, a boundary (right boundary) of the light incident region can be an edge of the active area AA, and another boundary (left boundary) of the light incident region can be the second side 262 of the LED backlight source 26, so that all lights L emitted upward from the LED backlight source 26 will be emitted to the optical coating layer CL, and no upward emitted light L is emitted out from the holes. However, the invention is not limited to this case. The left boundary of the light incident region can be located over the second side 262 of the LED backlight source 26, as shown in FIG. 2, the coating area of the optical coating layer CL can be changed according to different designs or different light path characteristics of the LED backlight source 26.

Figure 4A:
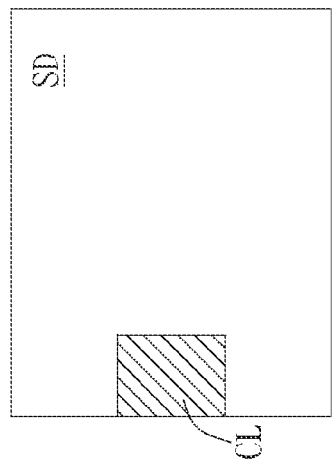
Figure 4B:
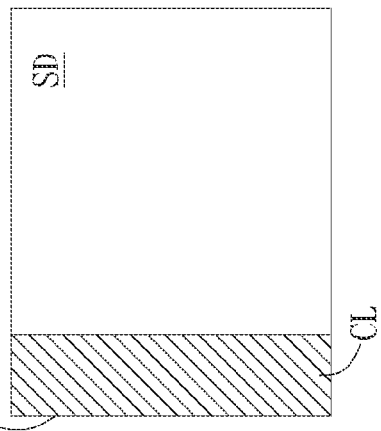
Figure 4C:
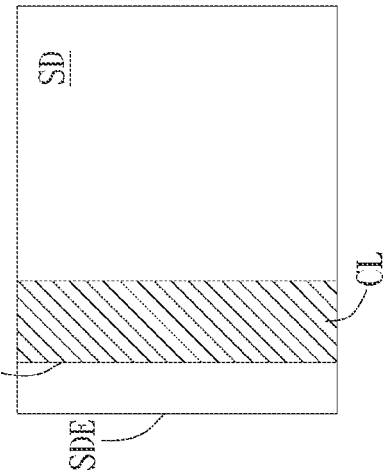
Figure 4D:
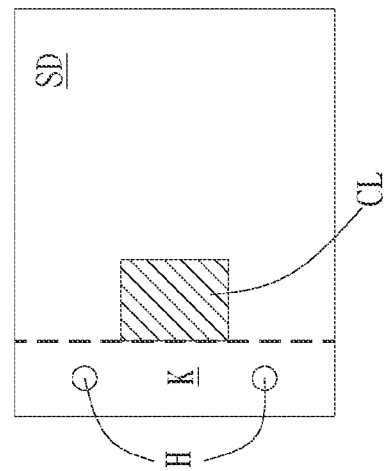

In practical applications, the location of the optical coating layer CL formed on the bottom surface SD of the extension portion 2140 has no specific limitations; it can be changed based on practical needs. For example, as shown in FIG. 4A and FIG. 4B, the optical coating layer CL can be a strip disposed at a side of the bottom surface SD of the extension portion 2140 near the LED backlight source 26. Wherein, the edge CLE of the optical coating layer CL in FIG. 4A is not aligned with the edge SDE of the bottom surface SD of the extension portion 2140; the edge CLE of the optical coating layer CL in FIG. 4B is aligned with the edge SDE of the bottom surface SD of the extension portion 2140. It should be noticed that the width of the strip optical coating layer CL has no specific limitations. Compared to FIG. 4A, since the edge CLE of the optical coating layer CL in FIG. 4B is aligned with the edge SDE, the manufacturing process will become easier. In FIG. 4C, the optical coating layer CL is only disposed corresponding to the open N to save material and reduce cost. That is to say, the boundaries (the upper boundary and the lower boundary) of the optical coating layer CL (namely the light incident region) correspond to the open N. In addition, since the open N corresponds to the second side 262 of the LED backlight source 26, the upper boundary of the optical coating layer CL (the light incident region) also corresponds to the LED backlight source 26. As shown in FIG. 4A, FIG. 4B, and FIG. 4C, the length of the optical coating layer CL in the vertical direction does not have to be the same with the length of the bottom surface SD of the extension portion 2140 in the vertical direction. In addition, FIG. 4D shows that the optical coating layer CL is disposed on the bottom surface SD of the extension portion 2140 in a form of multiple strips.

Figure 4E:
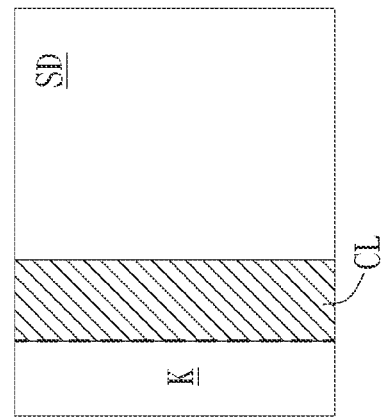
Figure 4F:
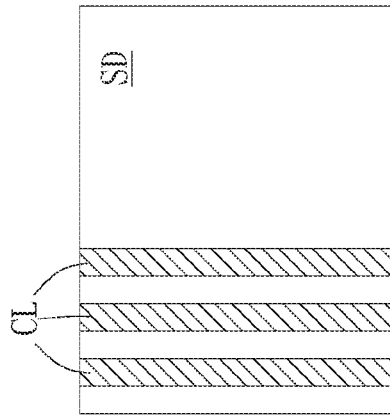

As shown in FIG. 4E, no optical coating layer CL is coated on a fold portion K of the bottom surface SD of the extension portion 2140, and the fold portion K can be folded downward along a dotted line (a boundary between the fold portion K and the non-fold portion) to encase the frame 22. The optical coating layer CL is only formed on the non-fold portion of the bottom surface SD instead of being formed on the fold portion K of the bottom surface SD, and an edge of the optical coating layer CL is aligned with the dotted line (the boundary between the fold portion K and the non-fold portion). In another embodiment, the optical coating layer CL can be coated on the fold portion K to increase the reflection and reduce light leakage. As shown in FIG. 4F, the optical coating layer CL is only disposed corresponding to the open N on the bottom surface SD of the extension portion 2140, and a hole H is disposed on the fold portion K. The hole H is used to wedge a bump on the frame 22 to position the bottom surface SD of the extension portion 2140, so that the optical coating layer CL can correspond to the open N. In addition, the boundaries (the upper boundary and the lower boundary) of the optical coating layer CL (namely the light incident region) correspond to the open N. Since the open N corresponds to the second side 262 of the LED backlight source 26, the upper boundary of the optical coating layer CL (the light incident region) also corresponds to the LED backlight source 26.

In addition, the shape of the optical coating layer CL coating on the bottom surface SD of the extension portion 2140 has no specific limitations; it is not limited to the strip shown in FIG. 4A and FIG. 4B or the rectangle shown in FIG. 4C. For example, the coating shape of the optical coating layer CL can be a square, a circle, an ellipse, a wavy edge, or any other geometry.

In this embodiment, because the surface roughness of the optical films such as the bottom diffusion film 214 is smaller than the ordinary frame, it is similar to the mirror, and the optical coating layer CL is coated on the surface of the optical film to enhance the light reflection of the surface of the optical film.

In practical applications, the optical coating layer CL can be formed on the bottom surface SD of the extension portion 2140 through a method of coating, deposition, or plating. The optical coating layer CL can be a light reflecting material or a light absorbing material. If the light reflecting material is selected as the optical coating layer CL, such as barium sulfate, titanium dioxide, silica, polyethyleneterephthalate (PET), white ink, white resin, or metal, the optical coating layer CL can reflect all lights L emitted to the extension portion 2140 of the bottom diffusion film 214 to the light incident end 202 and enter into the light guide plate 20. Therefore, the lights L will not be emitted out from the hole of the frame 22. If the light absorbing material is selected as the optical coating layer CL, such as grey resin, black resin, grey ink, and black ink, the optical coating layer CL can absorb all lights L emitted to the extension portion 2140 of the bottom diffusion film 214. Therefore, the lights L will not be emitted out from the hole of the frame 22.

Figure 5:
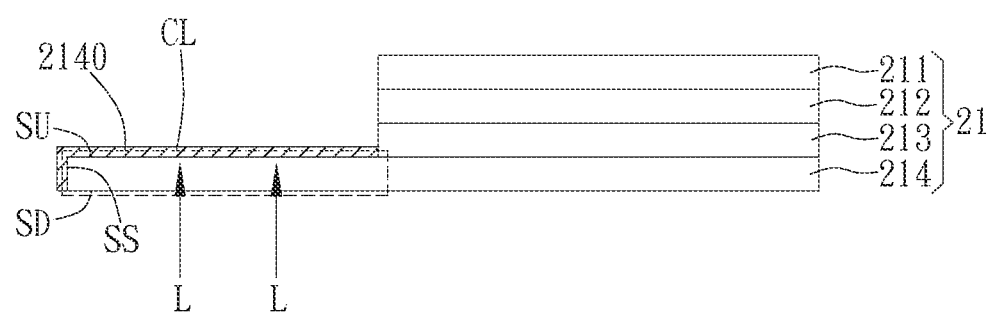

In another embodiment, the optical coating layer CL can be also formed on the top surface SU and the side surface SS of the extension portion 2140 of the bottom diffusion film 214 through a method of coating, deposition, or plating, as shown in FIG. 5. Under this design, although the lights emitted to the extension portion 2140 of the bottom diffusion film 214 may penetrate through the bottom surface SD of the extension portion 2140, but the optical coating layer CL formed on the top surface SU can also reflect or absorb the lights to prevent the lights from emitting out from the holes of the frame 22. And, the optical coating layer CL formed on the side surface SS of the extension portion 2140 can further enhance the light shading effect.

Figure 6:
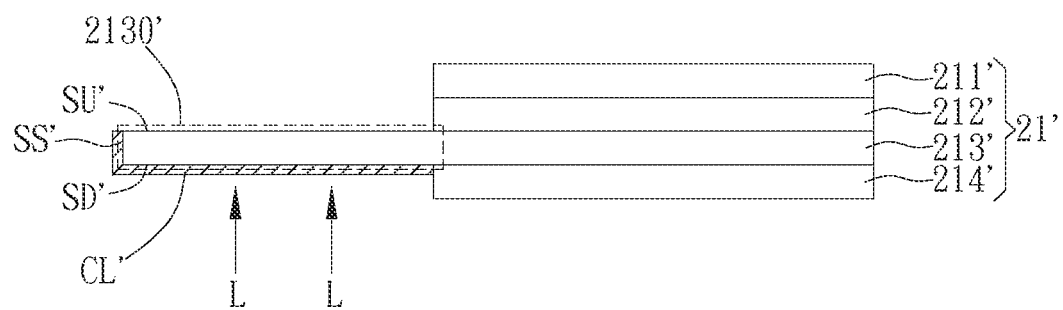

It should be noticed that the invention is not limited to the design of extending the bottom diffusion film 214 nearest to the light emitting surface 201 of the light guide plate 20 in the above-mentioned embodiment. In fact, the optical plate extending between the LED backlight source 26 and the LED holder 28 can be also the top diffusion film 211, the top prism film 212, or the bottom prism film 213 of the optical plate set 21. As shown in FIG. 6, in another embodiment, a top diffusion film 211', a top prism film 212', and a bottom diffusion film 214' of an optical plate set 21' are the same with the conventional optical plate set, but a prism film 213' of the optical plate set 21' includes an extension portion 2130', and the extension portion 2130' will extend between the LED backlight source 26 and the LED holder 28 just the same as the extension portion 2140 in FIG. 2 and extend until the edge of the open N of the LED holder 28. However, the invention is not limited to this case, for example, multiple optical films are coated by the optical coating layer CL respectively, all of the optical films have overlap area in the vertical projection direction, and can also have interlaced or complementary optical coating layer CL area in the vertical projection direction. These optical coating layers CL can enhance the reflection effect and reduce the light leakage. In another embodiment, a polarizer is often disposed under the display panel, and the polarizer has an extension portion to shade the lights.

The optical coating layer CL' is formed on a bottom surface SD' of the extension portion 2130' and the side surface SS' of the extension portion 2130' to reflect or absorb all of the lights L emitted to the extension portion 2130' of the prism film 213' to prevent the lights L from emitting out from the holes of the frame 22. And, the optical coating layer CL' coated on the side surface SS' of the extension portion 2130' can further enhance the light shading effect. In fact, the optical coating layer CL' can also formed on a top surface SU' of the extension portion 2130' without any specific limitations.

Similarly, in other embodiments, the optical plate set can also designed by extending the top diffusion film or the top prism film to prevent the lights L from emitting out from the holes of the frame 22. Because its theorem is similar to the above-mentioned embodiments, therefore, it will not be further described again.

Figure 7:
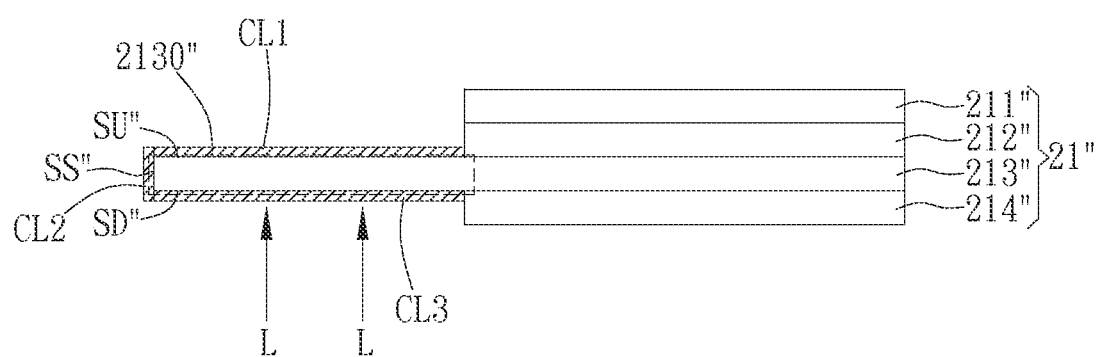

In addition, different optical coating layers can be also disposed on the extension portion in the invention. As shown in FIG. 7, an optical plate set 21" includes a top diffusion film 211", a top prism film 212", a bottom prism film 213", and a bottom diffusion film 214" layered stacking from top to bottom. Wherein, the top diffusion film 211", the top prism film 212", and the bottom diffusion film 214" are all the same with the conventional top diffusion film, top prism film, and bottom diffusion film, but the bottom prism film 213" includes an extension portion 2130" extending disposed above the LED backlight source 26, but the extension portion 2130" will not be disposed under the display panel C and its active area.

In this embodiment, optical coating layers CL1, CL2, and CL3 are formed on a top surface SU", a side surface SS", and a bottom surface SD" of the extension portion 2130" respectively. In this embodiment, the optical coating layers CL1, CL2, and CL3 can use different materials. For example, if the optical coating layer CL1 uses a light-reflecting material and the optical coating layer CL3 uses a light-absorbing material, the lights L emitted from the LED backlight source 26 upward will be absorbed by the optical coating layer CL3 firstly, and the other lights penetrating through the optical coating layer CL3 without being absorbed will be reflected by the optical coating layer CL1 to completely prevent the lights from emitting out from the holes. And, the optical coating layer CL2 can use the light-reflecting material or the light-absorbing material without any specific limitations.

On the other hand, if the optical coating layer CL1 uses a light-absorbing material and the optical coating layer CL3 uses a light-reflecting material, the lights L emitted from the LED backlight source 26 upward will be reflected by the optical coating layer CL3 firstly, and the other lights penetrating through the optical coating layer CL3 without being reflected will be absorbed by the optical coating layer CL1 to completely prevent the lights from emitting out from the holes. And, the optical coating layer CL2 can use the light-reflecting material or the light-absorbing material without any specific limitations.

Furthermore, the optical plate set of the backlight module in the invention is not limited to the design that only one optical plate has the extension portion. That is to say, the optical plate set can have two or more optical plates having the extension portion at the same time without any specific limitations.

Then, please refer to FIG. 8A and FIG. 8B. FIG. 8A and FIG. 8B illustrate different embodiments of the optical coating layer coated on the optical plate respectively. As shown in FIG. 8A, an end of a bottom diffusion film 214''' near a backlight source 26''' is bent downward outside the backlight source 26''', and optical coating layers CL1 and CL2 are disposed on the bottom diffusion film 214''' corresponding to the backlight source 26'''. And, the optical coating layers CL1 and CL2 can both use the light-reflecting materials, both use the light-absorbing materials, or use the light-reflecting material and the light-absorbing material without any specific limitations.

As shown in FIG. 8B, an end of a bottom diffusion film 214''' near a backlight source 26''' is bent downward between the backlight source 26''' and a light guide plate 20'''. The optical coating layer CL1 is disposed on the bottom diffusion film 214''' corresponding to the backlight source 26''', and the optical coating layer CL2 is disposed on the bottom diffusion film 214''' corresponding to the light guide plate 20'''. And, the optical coating layers CL1 and CL2 can both use the light-reflecting materials, both use the light-absorbing materials, or use the light-reflecting material and the light-absorbing material without any specific limitations. It should be noticed that when the optical coating layer CL1 uses the light-absorbing material, it has better effect of preventing the lights emitted from the holes.

Compared to the prior art, the backlight module applied in the liquid crystal display of the invention has a design of the original optical plate extending toward the LED backlight source, so that the backlight module of the invention can effectively prevent the light of the LED backlight source from emitting out of the backlight module from the holes on the metal member of frame without a reflecting film additionally disposed between the LED backlight source and the LED holder, not only the production cost of the backlight module can be lowered, but also the assembly process of the backlight module can be simplified.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:
1. A backlight module, comprising:
a light guide plate having a light emitting surface and a light incident end, wherein the light incident end is located at an adjacent side of the light emitting surface;
a backlight source disposed corresponding to the light incident end;
an optical plate disposed above the light emitting surface, the optical plate including an extension portion disposed above the backlight source;
an optical coating layer formed on a surface of the extension portion; and
a frame, disposed near a bottom and a side of the backlight source, the frame having a bottom surface, a sidewall, a folding portion, and a catching portion, wherein the bottom surface and the sidewall are connected, the folding portion and the catching portion are connected to the sidewall respectively, the folding portion and the bottom surface have no overlapping region in a vertical projection direction, and the catching portion and the bottom surface have an overlapping region in the vertical projection direction, the catching portion can be extended above the light guide plate, and the optical coating layer is disposed corresponding to an opening formed between the folding portion and the sidewall;
wherein the extension portion of the optical plate comprises a fold portion, and the fold portion is foldably extended into a space between the backlight source and the light incident end of the light guide plate; the surface of the extension portion comprises a fold portion, a non-fold portion, and a boundary between the fold portion and the non-fold portion, and the fold portion can be folded along the boundary, the optical coating layer is only formed on the non-fold portion of the surface instead of being formed on the fold portion of the surface, an edge of the optical coating layer is aligned with the boundary.
2. The backlight module of claim 1, wherein the optical plate is a diffusion film, a prism film, or a polarizer.
3. The backlight module of claim 1, wherein the optical coating layer is formed by a light reflecting material or a light absorbing material.

4. The backlight module of claim 3, wherein if the optical coating layer is formed by the light reflecting material, the light reflecting material is one selected from a group consisting of barium sulfate, titanium dioxide, silica, polyethyleneterephthalate (PET), white ink, white resin, and metal.

5. The backlight module of claim 3, wherein if the optical coating layer is formed by the light absorbing material, the light absorbing material is one selected from a group consisting of grey resin, black resin, grey ink, and black ink.

6. The backlight module of claim 1, wherein the optical coating layer and a part of the light guide plate are overlapped.

7. The backlight module of claim 1, wherein the surface is a top surface or a bottom surface of the extension portion.

8. The backlight module of claim 1, wherein the optical coating layer is formed in a light incident region on the surface of the extension portion, a boundary of the light incident region is an edge of an active area, and another boundary of the light incident region at most extends to be aligned with a side of the backlight source, the active area is a visible area of a display panel disposed above the backlight module.

9. The backlight module of claim 8, wherein the opening corresponds to the side of the backlight source and the extension portion extends to an edge of the opening.

10. The backlight module of claim 1, wherein the length of the optical plate in the horizontal direction is longer than the length of the light guide plate in the horizontal direction.

11. The backlight module of claim 1, wherein the area of the optical plate is larger than the area of the light guide plate.

12. The backlight module of claim 1, further comprising:
   another optical plate, also disposed above the light emitting surface, the another optical plate comprising another extension portion extending disposed above the backlight source.

13. The backlight module of claim 12, wherein the another optical plate is disposed above the optical plate or under the optical plate.

14. The backlight module of claim 1, wherein the optical coating layer is formed in a light incident region on the surface of the extension portion, a boundary of the light incident region corresponds to the opening of the frame or the backlight source.

* * * * *